(12) United States Patent
Ferguson

(10) Patent No.: US 10,075,062 B2
(45) Date of Patent: Sep. 11, 2018

(54) DUAL LEVEL CURRENT LIMIT APPARATUS AND METHOD

(71) Applicant: Microsemi Corporation, Aliso Viejo, CA (US)

(72) Inventor: Bruce Ferguson, Anaheim, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 0 days.

(21) Appl. No.: 15/789,975

(22) Filed: Oct. 21, 2017

(65) Prior Publication Data

US 2018/0123446 A1 May 3, 2018

Related U.S. Application Data

(60) Provisional application No. 62/413,453, filed on Oct. 27, 2016.

(51) Int. Cl.
*H02M 1/32* (2007.01)
*H02M 1/08* (2006.01)
*H02M 3/156* (2006.01)
*H02M 1/00* (2006.01)

(52) U.S. Cl.
CPC ............... *H02M 1/32* (2013.01); *H02M 1/08* (2013.01); *H02M 3/156* (2013.01); *H02M 2001/0025* (2013.01)

(58) Field of Classification Search
CPC . H02M 1/32; H02M 3/156; H02M 2001/0025
See application file for complete search history.

(56) References Cited

U.S. PATENT DOCUMENTS

| 4,356,543 | A | 10/1982 | Reynolds |  |
|---|---|---|---|---|
| 7,898,784 | B2 | 3/2011 | Chang |  |
| 8,482,894 | B2 | 7/2013 | Yra et al. |  |
| 8,737,091 | B2 | 5/2014 | Lund |  |
| 2002/0140408 | A1* | 10/2002 | Hwang | H02M 3/156 323/224 |
| 2006/0028188 | A1* | 2/2006 | Hartular | H02M 3/156 323/273 |
| 2013/0264969 | A1* | 10/2013 | Hamond | H05B 33/0815 315/307 |
| 2015/0200593 | A1* | 7/2015 | Stoichita | H02M 3/158 323/271 |
| 2016/0164416 | A1* | 6/2016 | Li | H02M 3/158 323/282 |
| 2016/0261194 | A1* | 9/2016 | Lam | H02M 3/156 |

* cited by examiner

*Primary Examiner* — Kyle J Moody
(74) *Attorney, Agent, or Firm* — Simon Kahn

(57) ABSTRACT

A dual level current limit apparatus constituted of: an electronically controlled switch coupled between a load and a line voltage; and a control circuitry arranged to alternately: control said electronically controlled switch to limit the magnitude of current flowing therethrough responsive to the difference between a predetermined first function of the current magnitude and a predetermined reference voltage, and control said electronically controlled switch to limit the magnitude of current flowing therethrough responsive to the difference between said first function of the current magnitude and a predetermined second function of the load voltage.

8 Claims, 4 Drawing Sheets

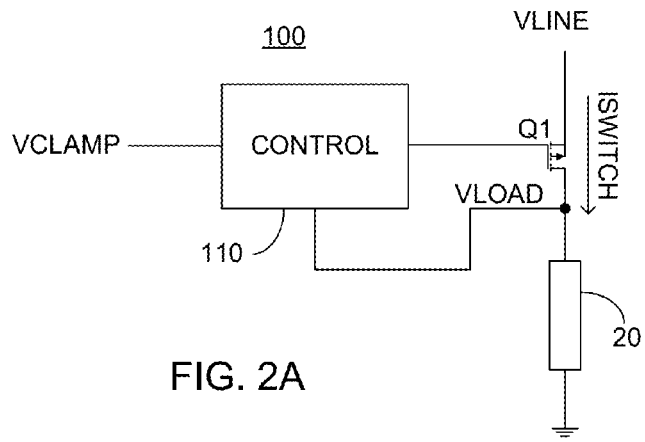

FIG. 2A

1000 — CONTROL SWITCH BETWEEN LINE VOLTAGE AND LOAD TO LIMIT CURRENT MAGNITUDE, RESPONSIVE TO DIFFERENCE BETWEEN CURRENT MAGNITUDE FIRST FUNCTION AND ALTERNATELY: REF. VOLTAGE; AND SECOND FUNCTION OF LOAD VOLTAGE

1010 — (OPT.) SELECTION BEING GREATER ONE OF REFERENCE VOLTAGE AND LOAD VOLTAGE SECOND FUNCTION

1020 — (OPT.) FIRST FUNCTION = VOLTAGE REPRESENTATION OF PREDETERMINED FRACTION OF CURRENT MAGNTIUDE

1030 — (OPT.) SECOND FUNCTION = PREDETERMINED FRACTION OF LOAD VOLTAGE - OFFSET VOLTAGE

FIG. 2B

DUAL LEVEL CURRENT LIMIT APPARATUS AND METHOD

BACKGROUND OF THE INVENTION

The present invention relates to the field of power distribution systems, and in particular to a power distribution switch fault state current limiter.

In direct-current (DC) power distribution systems a switch is typically used to apply or remove power to a load. The switch typically has a line side, which receives power from a power supply and a load side which is coupled to a load. Current flows through the switch from the line side to the load side.

In power distribution systems with many controllable loads, additional circuitry is added in order to prevent a fault condition occurring in one load from affecting the other switches and loads. An example of a fault condition would be a load side of a switch being shorted to ground, thus shorting out the common power source feeding many other switches and loads. It is common practice to enhance the on/off capability of the switch such that it behaves as a low impedance switch when the load current is within an expected range and behaves as a current limiting switch to afford some protection if a load fault occurs.

FIG. 1A illustrates a high level schematic diagram of a fold back current limit apparatus 10, which provides current limiting during a fault state of a load 20. Fold back current limit apparatus 10 comprises: an electronically controlled switch Q1, implemented in one embodiment, and illustrated herein, as a p-channel metal-oxide-semiconductor field-effect-transistor (PFET); an electronically controlled switch Q2, implemented in one embodiment, and illustrated herein, as a PFET; an electronically controlled switch Q3, implemented in one embodiment, and illustrated herein, as a PFET; a differential amplifier A1, implemented in one embodiment as an operational amplifier (op-amp); a sense resistor RS; a differential amplifier A2, implemented in one embodiment as an op-amp; and a plurality of resistors R1, R2 and R3. In one embodiment, PFET Q2 comprises a single transistor and PFET Q1 comprises 10,000 parallel connected transistors exhibiting identical properties with the transistor of PFET Q2.

The source of each of PFETs Q1 and Q2 are commonly coupled to a line voltage, denoted VLINE, and the gate of PFET Q1 is coupled to the gate of PFET Q2 and to the output of differential amplifier A2. The drain of PFET Q1 is coupled to load 20, to the non-inverting input of differential amplifier A1 and to a first end of resistor R1, the voltage at the junction denoted VLOAD. The inverting input of differential amplifier A1 is coupled to the drain of PFET Q2 and to the source of PFET Q3. The output of differential amplifier A1 is coupled to the gate of PFET Q3. The drain of PFET Q3 is coupled to the non-inverting input of differential amplifier A2 and to a first end of sense resistor RS. The inverting input of differential amplifier A2 is coupled to a second end of resistor R1, to a first end of resistor R2 and to a first end of resistor R3, the voltage at the junction denoted VLOAD. A second end of resistor R2 is coupled to a reference voltage VREF and a second end of resistor R3 is coupled to a common potential. A second end of sense resistor RS is coupled to the common potential.

In operation, PFET Q1 is initially closed and presents a low impedance current path from line voltage VLINE to load 20, the current flowing therethrough denoted ISWITCH. Responsive to the operation of differential amplifier A1 and PFET Q3, the drain voltages of PFETs Q1 and Q2 are equal. As described above, the gates of PFETs Q1 and Q2 are coupled together, as are the sources thereof. As a result, the magnitude of the current flowing through PFET Q2, denoted ICOPY, equals the magnitude of current ISWITCH divided by the dimension ratio of PFETs Q1 and Q2. Particularly, in the embodiment described above, the magnitude of current ICOPY equals ISWITCH/10,000.

As long as no fault is present at load 20, the voltage representation of ICOPY across sense resistor RSENSE will be significantly lower than voltage VLIMIT and differential amplifier A2 will maintain PFETs Q1 and Q2 in a low impedance state. Responsive to a fault at load 20, such as a short circuit, the magnitude of current ISWITCH will increase. When the voltage representation of ICOPY approaches voltage VLIMIT, the output of differential amplifier will become less negative thereby the resistance of PFET Q1 will increase and current ISWITCH will be limited by the value of voltage VLIMIT. Particularly, voltage VLIMIT is arranged such that the maximum magnitude of ISWITCH, denoted ILIMIT, is given as:

$$ILIMIT = \frac{10000}{R_{RS}} * \left[\left(\frac{R_{R2\|R3}}{R_{R1} + R_{R2\|R3}} * VLOAD\right) + \left(\frac{R_{R1\|R3}}{R_{R2} + R_{R1\|R3}} * VREF\right)\right] \qquad \text{EQ. 1}$$

where $R_{RS}$ is the resistance of sense resistor RS, $R_{R1}$ is the resistance of resistor R1, $R_{R2}$ is the resistance of resistor R2 and $R_{R3}$ is the resistance of resistor R3. As seen in EQ. 1, when a fault condition occurs across load 20, VLOAD will decrease thereby reducing the value of ILIMIT, in addition to the increase of the magnitude of ISWITCH. As a result, the magnitude of current ISWITCH will be rapidly reduced by PFET Q1.

FIG. 1B illustrates a graph of the power dissipation across PFET Q1, where the x-axis represents resistance values for load 20 in Ohms and the y-axis represents power dissipation values in Watts. Line 30 illustrates the power dissipation across PFET Q1 if the inverting input of differential amplifier A2 were to be coupled to a fixed reference voltage (not shown) and line 40 illustrates the power dissipation across PFET Q1 in fold back current limit apparatus 10. As illustrated, for a low resistance of load 20 the power dissipation of fold back current limit apparatus 10 is lower than the power dissipation with a fixed reference voltage. Unfortunately, for higher load resistances the power dissipation of fold back current limit apparatus 10 becomes greater than the power dissipation with a fixed reference voltage, making fold back current limit apparatus 10 efficient only for low load resistances.

What is desired, and not provided by the prior art, is a fold back current limiter which provides reduced power dissipation across a wide range of load resistances.

SUMMARY OF THE INVENTION

Accordingly, it is a principal object of the present invention to overcome at least some of the disadvantages of the prior art. This is provided in certain embodiments by a dual level current limit apparatus comprising: an electronically controlled switch coupled between a load and a line voltage; and a control circuitry arranged to alternately: control said electronically controlled switch to limit the magnitude of current flowing therethrough responsive to the difference between a predetermined first function of the current magnitude and a predetermined reference voltage, and control said electronically controlled switch to limit the magnitude of current flowing therethrough responsive to the difference between said first function of the current magnitude and a predetermined second function of the voltage across the load.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. The term coupled as used herein is not meant to be limited to a direct connection, and the use of appropriate resistors, capacitors, inductors and other active and non-active elements does not exceed the scope thereof. In the accompanying drawings:

FIG. 2A illustrates a high level schematic diagram of a dual level current limit apparatus, according to certain embodiments;

FIG. 2B illustrates a high level flow chart of the method of operation of the dual level current limit apparatus of FIG. 2A;

DETAILED DESCRIPTION OF PREFERRED EMBODIMENTS

Figure 1A:
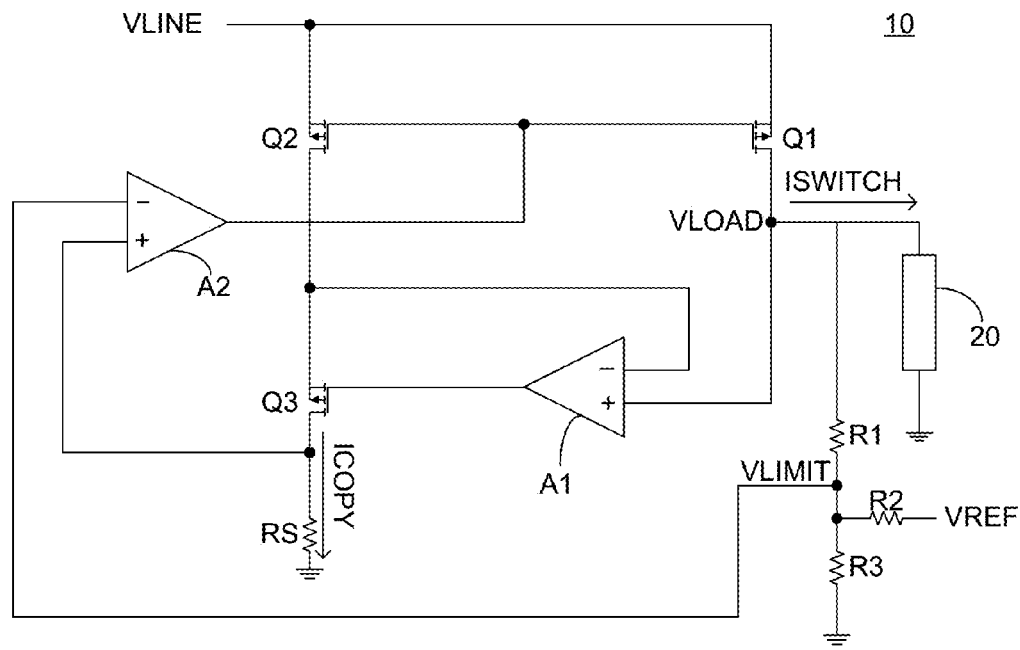
FIG. 1A illustrates a high level schematic diagram of a fold back current limit apparatus, according to the prior art.
Figure 1B:
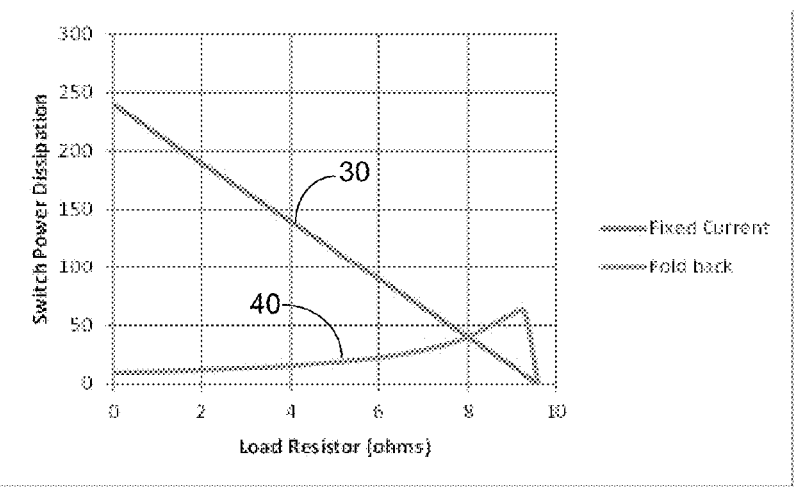
FIG. 1B illustrates a graph of the power dissipation of the fold back current limit apparatus of FIG. 1A.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 2A illustrates a high level schematic diagram of a dual level current limit apparatus 100 and FIG. 2B illustrates a high level flow chart of the method of operation of dual level current limit apparatus 100. Dual level current limit apparatus 100 comprises: an electronically controlled switch Q1; and a control circuitry 110. A load 20 is further illustrated. As described above, electronically controlled switch Q1 is in one embodiment implemented, and described herein, as a PFET. The source of PFET Q1 is coupled to a line voltage VLINE and the gate of PFET Q1 is coupled to an output of control circuitry 110. The drain of PFET Q1 is coupled to a respective input of control circuitry 110 and to load 20, the voltage at the junction denoted VLOAD. A respective input of control circuitry 110 is arranged to receive a reference voltage, denoted VCLAMP.

In operation, as described in stage 1000, control circuitry 110 is arranged to control PFET Q1 to limit the magnitude of the current flowing therethrough, denoted ISWITCH, responsive to the difference between a first function of the magnitude of current ISWITCH and a reference value. The reference value is alternately selected from one of: reference voltage VCLAMP; and a second function of voltage VLOAD.

In one embodiment, as described in optional stage 1010, the selection of control circuitry 110 of stage 1000 is arranged such that control circuitry 110 is arranged to select the greater one of reference voltage VCLAMP and the second function of load voltage VLOAD. Thus, dual level current limit apparatus 100 operates alternately as a fold back current limiter and a fixed reference current limiter.

In another embodiment, as described in optional stage 1020, the first function of the magnitude of current ISWITCH is a voltage representation of a predetermined fraction of the magnitude of current ISWITCH, optionally $\frac{1}{10000}$. In one embodiment, as described in optional stage 1030, the second function of voltage VLOAD is a subtraction of a predetermined fraction of voltage VLOAD and an offset voltage.

Figure 3A:
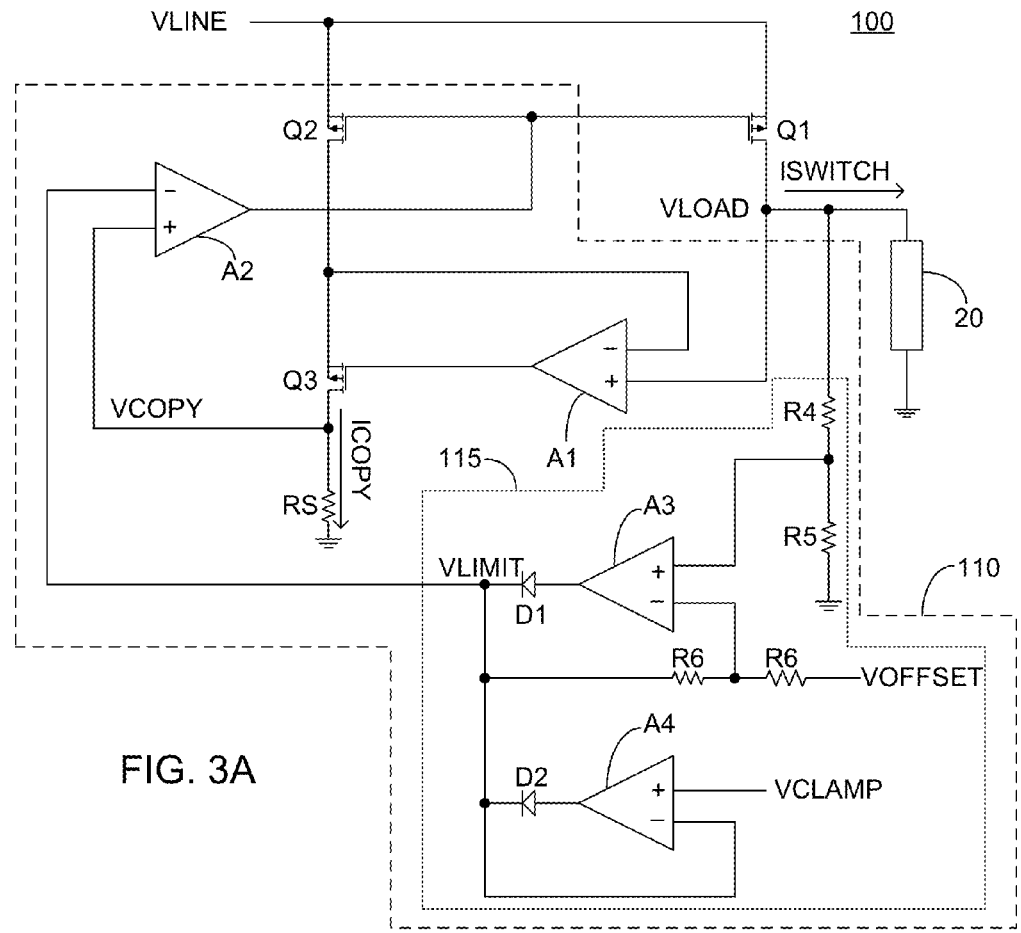
FIG. 3A illustrates a high level schematic diagram of a more detailed embodiment of the dual level current limit apparatus, according to certain embodiments.

FIG. 3A illustrates a high level schematic diagram of a more detailed embodiment of dual level current limit apparatus 100. Dual level current limit apparatus 100 comprises: PFET Q1; and control circuitry 110. Load 20 is further shown. Control circuitry 110 comprises: an electronically controlled switch Q2; an electronically controlled switch Q3; a pair of differential amplifiers A1 and A2; a sense resistor RS; and a reference circuitry 115. As described above, electronically controlled switches Q1 and Q2 are in one embodiment each implemented as a PFET, and are described herein as such. Reference circuitry 115 comprises: a pair of differential amplifiers A3 and A4, each implemented in one embodiment as an op-amp; a pair of unidirectional electronic valves D1 and D2, each implemented in one embodiment, and described herein, as a diode; a resistor R4; a resistor R5; and a pair of resistors R6.

The source of each of PFETs Q1 and Q2 are commonly coupled to a line voltage, denoted VLINE, and the gate of PFET Q1 is coupled to the gate of PFET Q2 and to the output of differential amplifier A2. The drain of PFET Q1 is coupled to load 20, to the non-inverting input of differential amplifier A1 and to a first end of resistor R4, the voltage at the junction denoted VLOAD. The inverting input of differential amplifier A1 is coupled to the drain of PFET Q2 and to the source of PFET Q3. The output of differential amplifier A1 is coupled to the gate of PFET Q3. The drain of PFET Q3 is coupled to the non-inverting input of differential amplifier A2 and to a first end of sense resistor RS. A second end of sense resistor RS is coupled to a common potential.

A second end of resistor R4 is coupled to the non-inverting input of differential amplifier A3 and to a first end of resistor R5. A second end of resistor R5 is coupled to the common potential. The inverting input of differential amplifier A3 is coupled to a first end of each of first and second resistors R6. A second end of first resistor R6 is coupled to an offset voltage, denoted VOFFSET. A second end of second resistor R6 is coupled to the cathode of each of diodes D1 and D2, to the inverting input of differential amplifier A4 and to the inverting input of differential amplifier A2, the voltage at the junction denoted VLOAD. The anode of diode D1 is coupled to the output of differential amplifier A3. The anode of diode D2 is coupled to the output of differential amplifier A4 and the non-inverting input of differential amplifier A4 is coupled to a reference voltage denoted VCLAMP.

In operation, as described above in relation to fold back current limit apparatus 10, PFET Q1 is initially closed and presents a low impedance current path from line voltage VLINE to load 20, the current flowing therethrough denoted ISWITCH. Responsive to the operation of differential amplifier A1 and PFET Q3, the drain voltages of PFETs Q1 and Q2 are equal. As described above, the gates of PFETs Q1 and Q2 are coupled together, as are the sources thereof. As a result, the magnitude of the current flowing through PFET Q2, denoted ICOPY, equals the magnitude of current ISWITCH divided by the dimension ratio of PFETs Q1 and Q2, which as described above is in one embodiment 1/10,000.

The voltage representation of ICOPY across sense resistor RS, denoted VCOPY, is compared by differential amplifier A2 to voltage VLIMIT. As illustrated, voltage VLIMIT is the greater of: reference voltage VCLAMP; and a second function of voltage VLOAD, defined by resistors R4, R5 and R6, and offset voltage VOFFSET. Particularly, the operation of diodes D1 and D2 allows only the greater output of differential amplifiers A3 and A4 to be presented to the inverting input of differential amplifier A2. As long as no fault is present at load 20, voltage representation VCOPY will be significantly lower than voltage VLIMIT and differential amplifier A2 will maintain PFETs Q1 and Q2 in a low impedance state. Responsive to a fault at load 20, such as a short circuit, the magnitude of current ISWITCH will increase. When voltage representation VCOPY approaches voltage VLIMIT, the output of differential amplifier A2 will become less negative and as a result the resistance of PFET Q1 will increase and current ISWITCH will be limited by the value of voltage VLIMIT. Particularly, voltage VLIMIT is arranged such that the maximum magnitude of ISWITCH, denoted ILIMIT, is the greater of:

$$ILIMIT1 = \frac{20000}{R_{RS}} * \left[\left(\frac{R_{RS}}{R_{R4}+R_{RS}} * VLOAD\right) - \left(\frac{VOFFSET}{2}\right)\right]; \text{ and} \quad \text{EQ. 2}$$

$$ILIMIT2 = \frac{10000 * VCLAMP}{R_{RS}} \quad \text{EQ. 3}$$

where $R_{RS}$ is the resistance of sense resistor RS, $R_{R4}$ is the resistance of resistor R4 and $R_{R5}$ is the resistance of resistor R5.

Figure 3B:
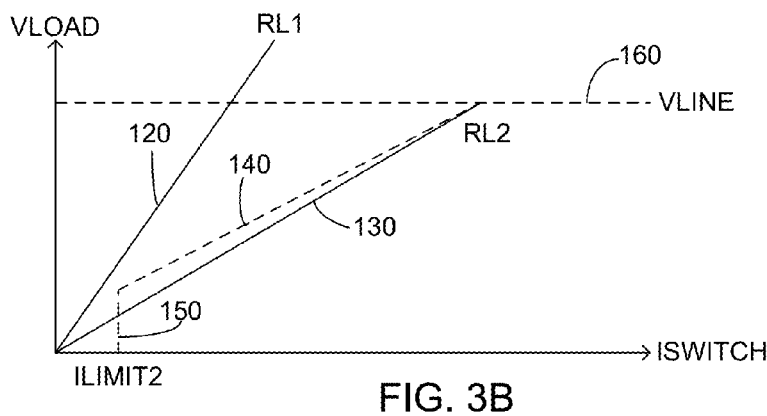
FIG. 3B illustrates a graph of load lines for the dual level current limit apparatus of FIG. 3A.

FIG. 3B illustrates a graph of load lines for dual level current limit apparatus 100, where the x-axis represents the magnitude of current ISWITCH and the y-axis represents load voltage VLOAD. Line 120 is the load line of a first load resistance, denoted RL1, and line 130 is the load line of a second load resistance, denoted RL2. Line 140 represents ILIMIT1, line 150 represents ILIMIT2 and line 160 represents line voltage VLINE. As illustrated by load line 120, when no fault is present at load 20 the load resistance is RL1 and load voltage VLOAD reaches voltage VLINE (excluding the small voltage drop across the closed PFET Q1) at line 160, and therefore dual level current limit apparatus 100 does not limit current ISWITCH. If a fault is present at load 20, the load resistance drops to RL2, as illustrated by load line 130. As illustrated, when the magnitude of current ISWITCH reaches value ILIMIT2, at the junction of lines 130 and 150, dual level current limit apparatus 100 begins limiting current ISWITCH to value ILIMIT2. Any further decrease in the load resistance will keep the magnitude of current ISWITCH limited to ILIMIT2. If the load resistance increases back towards RL1, dual level current limit apparatus 100 will cease limiting current ISWITCH. As load voltage VLOAD increases, voltage VLOAD will be equal to the output of differential amplifier A3 and current ISWITCH will be limited by value ILIMIT1, instead of value ILIMIT2, as described above.

As described above, dual level current limit apparatus 100 begins limiting the magnitude of current ISWITCH due to a drop in the resistance of load 20. The value of the load resistance for which current ISWITCH starts being limited, denoted RFAULT, is given as:

$$RFAULT \leq \frac{R_{RS}}{20000} * \frac{1}{\frac{R_{R4}}{R_{R4}+R_{RS}} - \frac{VOFFSET}{2*VLINE}} \quad \text{EQ. 4}$$

Since voltage VOFFSET is much less than voltage VLINE, EQ. 4 can be rewritten as:

$$RFAULT \leq \frac{R_{RS}}{20000} * \left(1 + \frac{R_{RS}}{R_{R4}}\right) \quad \text{EQ. 5}$$

Dual level current limit apparatus 100 is inherently hysteretic, thus the load resistance value which ceases the current limiting of current ISWITCH, denoted RECOVERY, is greater than resistance RFAULT and given as:

$$RRECOVERY = \frac{R_{RS}}{20000} * \left(1 + \frac{VOFFSET}{VCLAMP}\right) * \left(1 + \frac{R_{RS}}{R_{R4}}\right) \quad \text{EQ. 6}$$

The value of the hysteresis, denoted H1, is thus given as:

$$H1 = \frac{RRECOVERY}{RFAULT} = 1 + \frac{VOFFSET}{VCLAMP} \quad \text{EQ. 7}$$

Figure 3C:
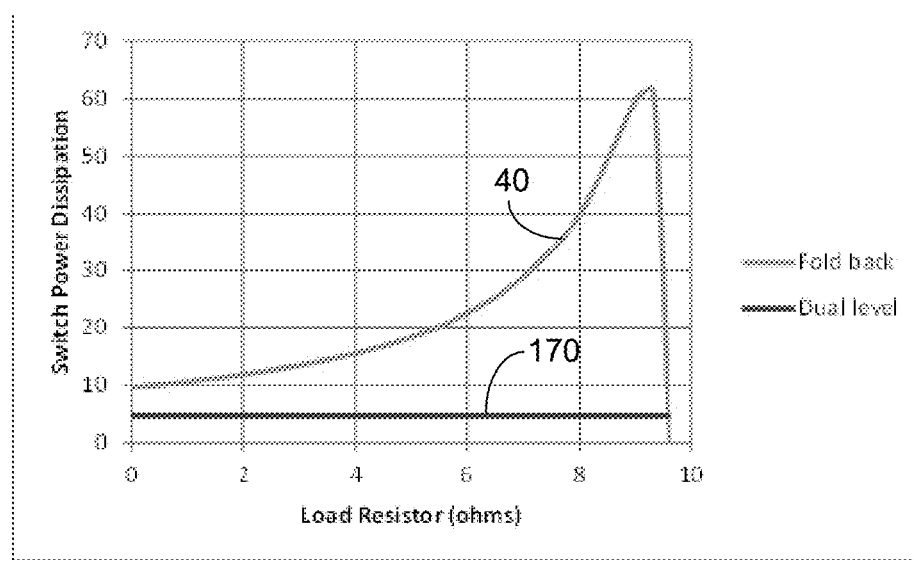
FIG. 3C illustrates a graph of the power dissipation of the dual level current limit apparatus of FIG. 3A.

FIG. 3C illustrates a graph of the power dissipation across PFET Q1, where the x-axis represents resistance values for load 20 in Ohms and the y-axis represents power dissipation values in Watts. Line 40 illustrates the power dissipation across PFET Q1 in fold back current limit apparatus 10 described above and line 170 illustrates the power dissipation across PFET Q1 in dual level current limit apparatus 100. As illustrated by lines 40 and 170, dual level current limit apparatus 100 provides significantly reduced power dissipation as opposed to fold back current limit apparatus 10 of the prior art.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A dual level current limit apparatus comprising:
   an electronically controlled switch, a first terminal of said electronically controlled switch coupled to a load and a second terminal of said electronically controlled switch coupled to a line voltage;
   a reference circuitry arranged to alternately output a predetermined reference voltage and a predetermined first function of the load voltage;
   a first differential amplifier, a first input of said first differential amplifier arranged to receive a predetermined second function of a magnitude of current flowing through said electronically controlled switch, a second input of said first differential amplifier arranged to receive said output of said reference circuitry and an output of said first differential amplifier coupled to a third terminal of said electronically controlled switch such that the magnitude of the current flowing through said electronically controlled switch is limited responsive to a difference between said current magnitude second function and said reference circuitry output.

2. The dual level current limit apparatus of claim 1, wherein said reference circuitry is arranged to output a greater one of said predetermined reference voltage and said predetermined load voltage first function.

3. The apparatus of claim 2, wherein said reference circuitry comprises:
   a second differential amplifier, a first input of said second differential amplifier arranged to receive a predetermined third function of the load voltage and a second input of said second differential amplifier arranged to receive a predetermined offset voltage, said load voltage first function determined responsive to said load voltage third function and said predetermined offset voltage;
   a first unidirectional electronic valve, a first end thereof coupled to an output of said second differential amplifier;
   a third differential amplifier, an input of said third differential amplifier arranged to receive said predetermined reference voltage; and
   a second unidirectional electronic valve, a first end thereof coupled to an output of said second differential amplifier,
   wherein a second end of both of said first and second unidirectional electronic valves are commonly coupled to said second input of said first differential amplifier.

4. A dual level current limit apparatus comprising:
   an electronically controlled switch coupled between a load and a line voltage; and
   a control circuitry arranged to alternately:
      control said electronically controlled switch to limit a magnitude of current flowing therethrough responsive to a difference between a predetermined first function of the current magnitude and a predetermined reference voltage, and
      control said electronically controlled switch to limit the magnitude of current flowing therethrough responsive to a difference between said predetermined first function of the current magnitude and a predetermined second function of the load voltage.

5. The dual level current limit apparatus of claim 4, wherein said alternate control of said control circuitry is responsive to a greater of said predetermined reference voltage and said predetermined load voltage second function.

6. The dual level current limit apparatus of claim 5, wherein said control circuitry comprises:
   a first differential amplifier, a first input of said first differential amplifier arranged to receive a predetermined third function of the load voltage and a second input of said first differential amplifier arranged to receive a predetermined offset voltage, said load voltage second function determined responsive to said load voltage third function and said predetermined offset voltage;
   a first unidirectional electronic valve, a first end thereof coupled to an output of said first differential amplifier;
   a third differential amplifier, an input of said third differential amplifier arranged to receive said predetermined reference voltage; and
   a second unidirectional electronic valve, a first end thereof coupled to an output of said second differential amplifier,
   wherein a second end of both of said first and second unidirectional electronic valves are commonly coupled to each other, such that the greater of said predetermined reference voltage and said predetermined load voltage second function is output at the common junction of said first and second unidirectional electronic valves.

7. A dual level current limiting method, the method comprising, alternately:
   limiting a magnitude of current flowing through an electronically controlled switch coupled between a load and a line voltage responsive to a difference between a predetermined first function of the current magnitude and a predetermined reference voltage; and
   limiting the magnitude of current flowing through the electronically controlled switch responsive to a difference between said first function of the current magnitude and a predetermined second function of the load voltage.

8. The method of claim 7, wherein said alternate limiting is responsive to a greater of said predetermined reference voltage and said predetermined load voltage second function.

* * * * *